April 9, 1940.  G. A. MOORE  2,196,666
METHOD AND MEANS OF MAKING CONTAINERS
Filed Nov. 21, 1938  5 Sheets-Sheet 1

INVENTOR.
George Arlington Moore
BY
F. Bascom Smith
ATTORNEYS.

April 9, 1940. G. A. MOORE 2,196,666
METHOD AND MEANS OF MAKING CONTAINERS
Filed Nov. 21, 1938 5 Sheets-Sheet 3

INVENTOR
George Arlington Moore
BY F. Bascom Smith
ATTORNEY

April 9, 1940.  G. A. MOORE  2,196,666
METHOD AND MEANS OF MAKING CONTAINERS
Filed Nov. 21, 1938   5 Sheets-Sheet 4

INVENTOR.
George Arlington Moore
BY F. Bascom Smith
ATTORNEYS.

April 9, 1940.　　　　　G. A. MOORE　　　　2,196,666
METHOD AND MEANS OF MAKING CONTAINERS
Filed Nov. 21, 1938　　　5 Sheets-Sheet 5

INVENTOR
George Arlington Moore
BY
F. Bascom Smith
ATTORNEY

Patented Apr. 9, 1940

2,196,666

UNITED STATES PATENT OFFICE 2,196,666

METHOD AND MEANS OF MAKING CONTAINERS

George Arlington Moore, Louisville, Ky., assignor to Humoco Corporation, Louisville, Ky., a corporation of Delaware Application November 21, 1938, Serial No. 241,599

14 Claims. (Cl. 93—3)

This invention relates to a method for fabricating containers of fragile material, and also to one form of apparatus for carrying out the method.

One of the objects of the present invention is to provide a novel method for fabricating a container which will be airtight and impervious and which is particularly adapted for use in packaging yieldable materials, such, for example, as cigarettes.

It has been found highly desirable to employ a thin aluminum sheet for the material of the container, and preferably, the aluminum sheet is joined to a supporting sheet of paper or other material. A thin aluminum sheet tends to fracture easily when folded, and it has been found desirable in carrying out the present method to anneal the aluminum and thereafter coat the same with a thermoplastic lacquer. The particular materials and thermoplastics employed are set forth more fully in my prior co-pending applications Serial No. 131,616, filed March 18, 1937, and Serial No. 225,114, filed August 16, 1938, and constitute per se no part of the present invention. For example, the base materials may be coated with nitro-cellulose lacquer compounded to contain about 26% solids and with a cyclized rubber plastic or vinyl resins.

Material of the above character tends at all times during fabrication to return to its original flat state, and another object of the present invention is to provide a novel method which will overcome the difficulties inherent in employing thin metallic sheets of the character specified above.

Where containers are made of relatively heavy and rigid material, the closing and sealing of the container, after the same has been filled with some yieldable product, present little difficulty, since the rigid material will resist the necessary pressures applied during the fabricating processes and prevent damage to the product. One of the objects of the present invention is to provide a novel method for fabricating containers of fragile material, the method of fabrication being such that hermetic seams requiring considerable pressures and heat may be made without damage to the material within the container even though this material is of a yieldable nature, such as cigarettes, for example.

Another object of the invention is to provide a novel method of the above character whereby containers may be formed, packed and hermetically sealed in large volume at high production speed with facility and economy.

A further object is to provide novel apparatus for carrying out the above methods.

Another object is to provide a simplified mechanism for fabricating containers at high production speed, the mechanism being such that package fabricating machines now in industrial use may be readily and inexpensively altered to embody said mechanism.

Another object is to provide a novel method whereby successive portions of a single web of material are registered with suitable fabricating means, formed into a container by said means, packed and hermetically sealed to provide a sturdy and pleasing package having wide sales appeal.

The above and other objects and advantages of the present invention will appear more fully hereafter in the detailed description which is to be read in connection with the accompanying drawings for an understanding of the invention. It is to be expressly understood, however, that the drawings are for purposes of illustration only and are not designed as a definition of the limits of the invention, reference being had for this purpose to the appended claims.

In the drawings, wherein like reference characters refer to like parts throughout the several views.

Fig. 27 is a diagrammatic view illustrating the various steps of the method and showing one wiring diagram which may be employed in the apparatus; and, Figs. 28 to 32, inclusive, are perspective views of the container in its various stages of manufacture.

Figures 1, 2:
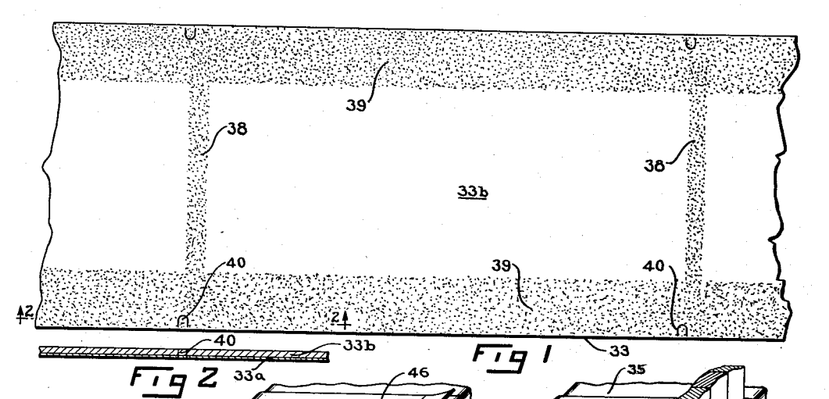
Fig. 1 is a plan view of a portion of a web of material employed in fabricating the container referred to above.
Fig. 2 is an enlarged sectional view of a portion of the material shown in Fig. 1.

The material from which the container is preferably made comprises a strip of sheet material 33 consisting of a thin layer of sheet aluminum 33a (Fig. 2) joined to a sheet of long fiber paper or other suitable material 33b, this material being delivered from a reel 34 (Fig. 27) to arbors 35 mounted on a turret secured to a shaft 36 supported by the frame of the machine in a manner well understood in the art. As the web is being fed to the arbors, it is cut to the desired length by suitable mechanism including a knife 37. The mechanism for feeding and registering the material and for cutting it into the desired lengths may be of any suitable type known in the art, but preferably said mechanism is of the type illustrated and described in my co-pending application Serial No. 225,891, filed August 20, 1938, it being understood that the feeding and cutting mechanism per se constitutes no part of the present invention.

The sheet material 33 carries thermoplastics, the paper surface 33b thereof preferably being striped with a thermoplastic, such as a cyclized rubber compound, for example, as shown at 38 and 39 (Fig. 1) to provide the necessary adhesive for forming the seams, while the aluminum foil is coated wholly or partially with a nitro-cellulose lacquer. Stripes 39 are preferably sufficiently wide to cover slightly more than the inner end surfaces of the container to be hereinafter described in order to provide an additional protective surface, particularly at the corners where minute fractures are apt to occur in the foil layer 33a.

Tongues 40 cut in the material cooperate with the feeding mechanism to secure register. As the web material is fed to the first arbor 35 (Fig. 27) it is cut to a length equal to the distance between centers of successive tongues 40 and is then wound about the arbor by means of a folding plate 48, which closely engages the material with the arbor, and two tucking arms or blades 42 and 43 which fold the material into the overlapping position shown in Fig. 3. In order to hold the resilient material in position on the arbor with the end portions 44 and 45 overlapping, there is preferably employed a clamp 46 carried by an arm 47 (Fig. 8) and a second clamping member 48 engaging the opposite side of the material. It will be noted that the material is of such a dimension that a marginal portion of the same extends outwardly from the outer end of the arbor (Figs. 3 and 4), and in order to support this overhanging end and to form a continuous seam throughout the length of the container body, there is provided a reciprocating shoe 49 which has a step 50 thereon, the height of the step being exactly equal to the thickness of the wall of arbor 35. Suitable mechanism (not shown) is effective to move the shoe into the arbor so that the upper raised portion of said shoe forms one continuous surface with the outer surface of the arbor whereby the overhanging portion of the material of the container is supported, as well as the arbor, when a suitable sealing iron 51 is moved into engagement with the overlapped material to activate the thermoplastic and to form the longitudinal or body seam. Any suitable sealing iron may be employed but preferably the same is a sectional iron and is made, mounted and actuated in accordance with the disclosure of my co-pending application Serial No. 226,218, filed August 23, 1938.

Figures 27, 28, 29, 30, 31, 32:
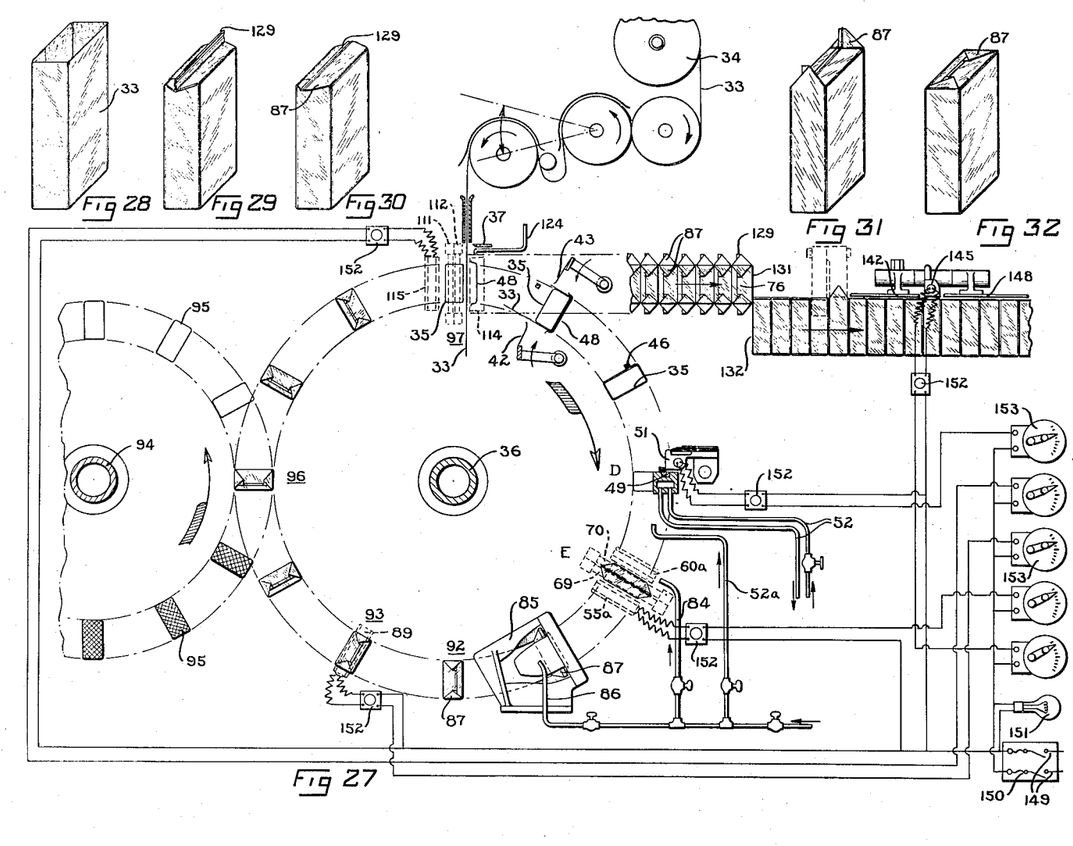

The heat and pressure applied to the overlapped material by iron 51 is effective to activate the thermoplastic stripe 38 and to form an impervious body seam. The heat passes through the two thicknesses of material into the arbor and shoe 49. This heat is quickly dissipated in arbor 35, but since the shoe must engage each arbor as the same is rotated to the seaming position, and since this single shoe must receive the heat from the iron each time a longitudinal or body seam is formed, said shoe, unless cooled will quickly store up enough heat to raise the temperature thereof to such a degree that the activated film employed in cementing the seam will not cool and set. Accordingly a small amount of water is circulated through the sliding bearings that carry the shoe, the water being conducted through pipes 62 (Fig. 27).

The turret carrying the arbors is now rotated to another position where the bottom end seam of the container is formed. One suitable form of mechanism for performing this operation is shown in Figs. 5, 6 and 8 to 11, inclusive, and comprises a shaft 53 (Fig. 8) rotatably mounted in the frame of the machine, to which shaft is secured a lever 54 adapted to be angularly reciprocated by suitable cam mechanism (not shown) whereby said shaft 53 may be oscillated. Mounted on shaft 53 and secured thereto for movement therewith is an arm 55 which carries a pivot member 56 for a link 57. A similar link 58 is pivotally secured as at 59 to a second arm 60 which is quite similar in construction to arm 55, but arm 60 is rotatably mounted on shaft 53. The two links 57 and 58 are pivotally connected at 61 to a lever 62 which is pivoted at its lower end to the machine frame at 63.

The linkage 57, 58 which thus interconnects jaws or arms 55 and 60 insures, what may be termed, centralized closing movement of said arms by the application of power to only one arm through lever 54. The follower arm 60 will oppose movement of the driving arm 55 with a pressure proportional to the power applied so that when said arms are brought together, in a manner to hereinafter appear, one will not overpower the other. Accordingly, no lost motion will be developed and the arms will meet during each operation in the desired central position.

Arm 55 engages a stop pin 64 carried on an arm 65 which is freely rotatable on shaft 53, and arm 60 engages a stop pin 66 carried by an arm 67 similar to arm 65 and also freely rotatable on shaft 53. Suitable springs 68, only one of which is shown, yieldingly hold arm 60 in engagement with stop pin 66 and arm 55 in engagement with stop pin 64, and said springs 68 impart movement to arms 65 and 67 when motion is imparted to arms 55 and 60. Arms 65 and 67 are provided with lateral extensions 65a and 67a, each arm having two such extensions, for rotatably receiving upper and lower folding blades 69 and 70 (Figs. 5, 6, 10 and 11) for use in forming the bottom end seam of the container.

In order to insure that the operation of blades 69 and 70 will not cause buckling or bending of the material in an improper manner, means are provided for extending the lower open end of the container walls in a manner to lead the folding blades. For this purpose, shaft 53 is provided with a pair of laterally spaced spiral gears 71 (Figs. 8 and 9) which are secured to said shaft for rotation therewith, one of said gears only being shown. Spiral gears 71 engage spiral gears 72 (Fig. 11) which are rotatably mounted on studs 73 carried by a stationary frame member 74. Secured to each of the spiral gears 72 for rotation therewith is a curved arm 75, which normally occupies the dotted line position shown in Fig. 11 and is adapted to swing outwardly to the full line position shown in this same figure.

Figures 3, 4, 5, 6, 7:
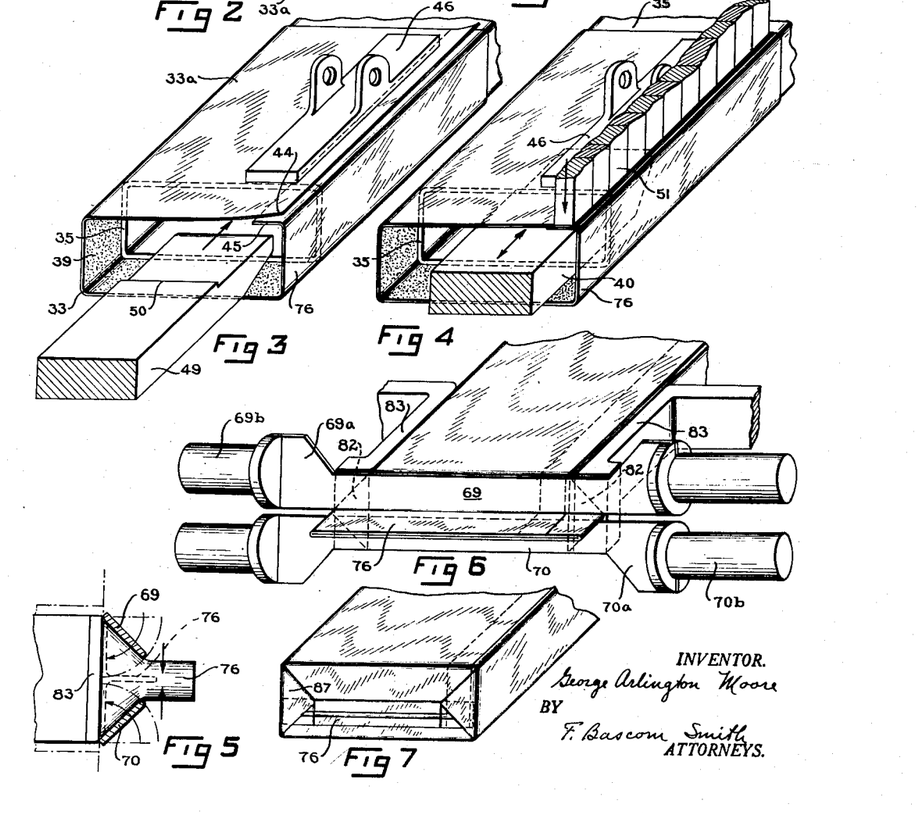
Fig. 3 is a perspective view illustrating a section of the sheet material of Fig. 1 folded about an arbor immediately prior to the formation of the longitudinal body seam.
Fig. 4 is a perspective view illustrating the relation of the side walls of the container to a heating element and an arbor at the instant that the longitudinal body seam is formed.
Fig. 5 is a detail view, partly in section and with parts broken away, illustrating the formation of one end seam of the container, the folding mechanism for the end seam being in an intermediate position.
Fig. 6 is a perspective view, with parts broken away, illustrating one type of folding mechanism, as shown in Fig. 5 for forming the end seam, in a final position.
Fig. 7 is a perspective view, with parts broken away, of one end of the container.
Figures 8, 9, 10, 11:
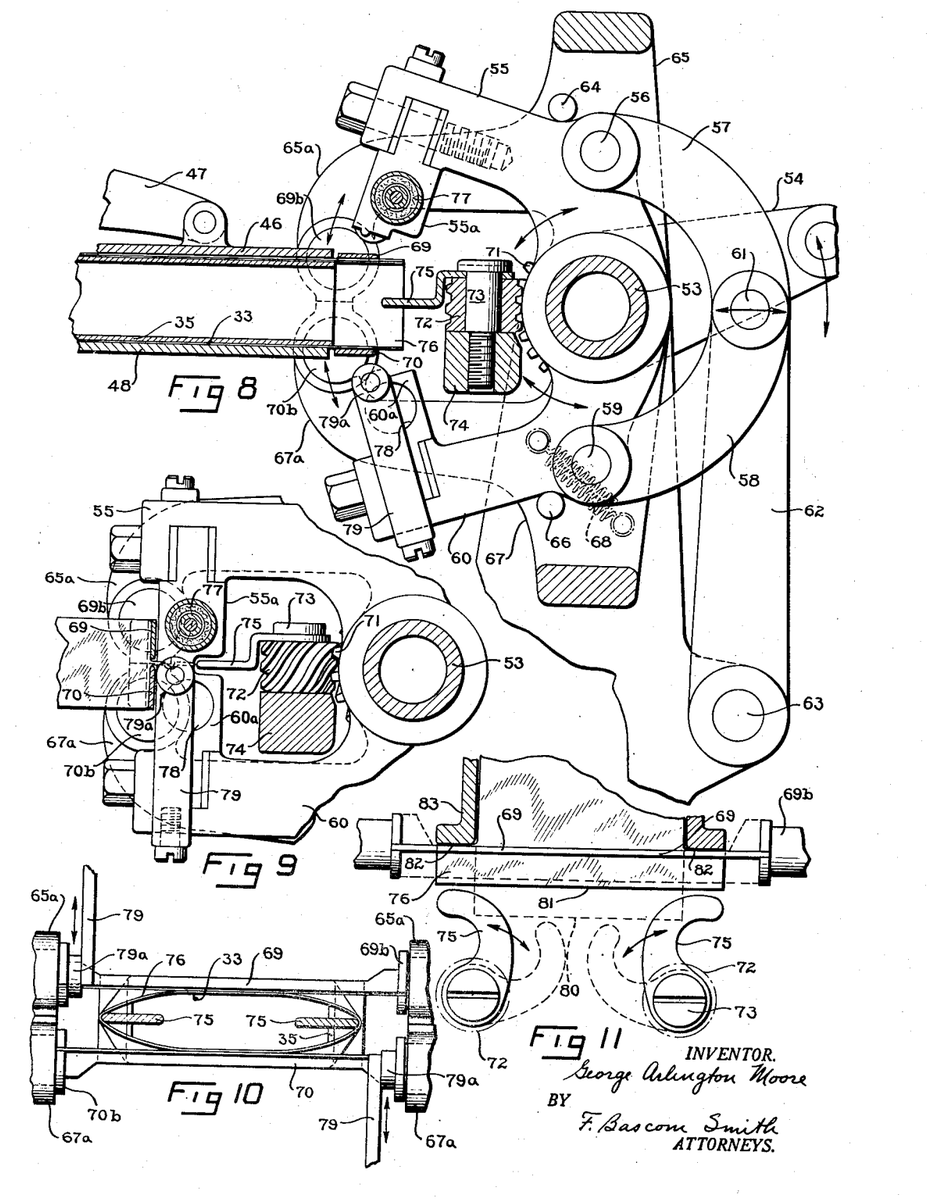
Fig. 8 is a sectional side elevation illustrating one form of end seam folding and sealing mechanism which may be employed in carrying out the method of the present invention, the parts being in an intermediate position.
Fig. 9 is a detail sectional view showing certain of the parts of Fig. 8 in a final position.
Fig. 10 is an end view, with parts broken away, illustrating an intermediate step in the formation of the end seam.
Fig. 11 is a top plan view of the mechanism shown in Fig. 10.

After the spreader arms 75 and the folding blades 69 and 70 have shaped the thin material of the container in a manner shown in Figs. 5 and 10, the extending portion 76 of the end of the container must be sealed throughout the length thereof to form an hermetic closure seam. For this purpose, arm 55 (Figs. 8 and 9) is provided with an extension 55a constituting a sealing iron which carries a cartridge heater 77, and arm 60 is provided with a similar sealing iron 60a which has an opening therein at 78 rather than a cartridge heater, it being understood that the sealing irons have a length slightly greater than that of the end seam to be formed in the container. Secured to arms 55 and 60 are bars 79 (Figs. 8, 9 and 10) which carry at their outer ends rollers 79a adapted to engage the enlarged portions of folding blades 69 and 70 as at 69a and 70a (Fig. 6), whereby the folding blades are rotated about their pivot members 69b, 70b to assist in forming the bottom seam. The blades are returned to normal position by suitable spring means, not shown but similar to spring 101a (Fig. 16) to be referred to hereinafter.

In operation, a suitable cam mechanism (not shown) moves lever 54 upwardly to rotate shaft 53 in a counter-clockwise direction, as viewed in Fig. 8, whereby a counter-clockwise movement is imparted to arm 55, and through links 57, 58 and lever 62 a clockwise movement to arm 60. Springs 68 impart similar movements to arms 65 and 67 so that the last-named pair of arms is moved inwardly into engagement in advance of the final closing of arms 55 and 60, as is shown in Fig. 8. At the instant that extensions 65a and 67a of said arms engage, the folding blades 69, 70 carried by said extensions occupy a position parallel to the upper and lower side walls of the container, the inner edges of the folding blades lying substantially in the plane of the outer end of arbor 35 and extending outwardly along the overhanging portion of the container walls.

The movement of shaft 53 is effective through spiral gears 71 and 72 to swing the spreader arms 75 about their pivots, and the outer ends of said arms engage the inner surface of the side walls of the overhanging portion of the container body and spread these side walls as shown in Fig. 10. Simultaneously, arm portions 55a and 60a move to a position such that rollers 79a engage the folding blades, whereby the upper blade 69 (Fig. 5) is pivoted downwardly and the lower blade 70 is pivoted upwardly. The overhanging side walls are thus drawn away from the spreader arms 75, said arms serving merely to gain a lead for the operation of the folding blades and to prevent wrinkling or buckling of the material. At the time members 75 operate to extend the open end of the container, the side wall material is warm, since it still retains some of the heat imparted to it by sealing iron 51 at the previous station. Accordingly, if members 75 place any appreciable strain on the material, the body seam, which is not fully set, will be destroyed. It will be noted that as the members 75 swing outwardly, the folding blades 69 and 70 are pulling the material away from members 75 with the result that insufficient pressure is exerted on the inner walls of the container to destroy the body seam. Preferably, compressed air is directed against the portion of the body seam which extends beyond the end of arbor 36 during the time that the arbor, with the newly-formed seam, is moving from the body-seam-forming position to the folding position to assist in the quick setting of said seam. For this purpose, an air tube 52a (Fig. 27) supplies the necessary air from a suitable pressure source. Before the material of the end seam has reached the flattened position shown in Fig. 6, it will have been drawn toward arbor 35 sufficiently so that members 75 will be completely out of engagement with the container walls. This operation will best be understood by reference to Fig. 11, wherein the initial positions of the walls of the container and of members 75 are shown in dotted lines, the outer end of the container being shown at 80.

Since members 75 and blades 69 and 70 operate simultaneously, the end of the container walls is moved inwardly as arms 75 swing outwardly, with the result that the end of said walls reaches the position 81 out of the path of members 75, due to the action of the folding blades, before members 75 move to the full limit of their travel. In their final position, blades 69 and 70 lie in the same plane, as is shown in Figs. 6, 9 and 11, with two portions of the overhanging part of the container folded down at right angles to the upper and lower side walls of the arbor and the side wall of the container, and with the extending portion 76 forming a tab, the inner walls of said extending portion being in engagement throughout the periphery thereof.

Further rotation of shaft 53 is effective, through the linkage mechanism, to bring the sealing irons 55a and 60a into engagement with the tab 76 to activate the thermoplastic film 39 thereon and form a continuous hermetic seam at the lower end of the container, as shown in Fig. 9. Preferably, the sealing irons are provided with a longitudinal rib and groove to insure compacting of the material of the tab intermediate its ends, thereby further insuring an impervious seam.

The bottom end seam thus formed is of greater length than the width of the arbor, and the outer ends of said extending portions 76 are joined to the side walls of the body by triangular tabs 82, as shown in dotted lines in Fig. 6. In order that there may be no wrinkles formed in the material at this point, shoes 83 (Figs. 6 and 11) are moved into position alongside the arbor so that the outer ends of said shoes engage the faces of said triangular tabs and coact with the folding blades to maintain the material in a smooth condition.

To prevent overheating of sealing member 60a, a blast of air is preferably directed through the opening 78 in said sealing member during or after each sealing operation, the air being conducted to said opening through a suitable pipe 84 (Fig. 27), thus preventing the storing up of excess heat.

The cam mechanism associated with lever 54 is now effective to move the lever in the opposite direction to return the parts to the original position, whereupon the container is freed and the turret is rotated to the next station.

Figures 12, 13, 14:
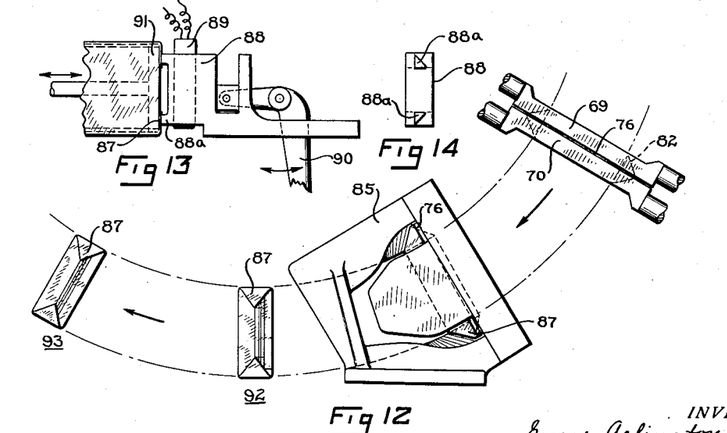
Fig. 12 illustrates one type of mechanism which may be used for plowing in the fold resulting from the seam in the bottom of the container.
Fig. 13 is a detail side view, with parts broken away, of one form of apparatus which may be employed in tacking down the tabs at the bottom of the container.
Fig. 14 is an end detail view of the sealing iron shown in Fig. 13.

At this latter station, the extending portion 76 of the seam is folded down against the end of the container and the triangular tabs 82 are folded up through 180° so that they lie flat against the end of the container. To effect this operation, a plow 85 (Figs. 12 and 27) is preferably employed, said plow being formed with spiral surfaces for turning the extended tabs through 180°. Preferably, a blast of air, controlled by pipe 86 (Fig. 27), is directed against the plow plate to facilitate the setting of the end closure seam, and to prevent damage to the seam during the folding over of tab 76 and the plowing over of the tabs.

In the form shown, the container is formed with the foil on the outer surface, and when said container emerges from the plow, the tabs 87 (Figs. 7, 24, 31 and 32) lie flat against the lower end of the container but are not adhesively secured thereto. In order to prevent tearing of the material during subsequent handling, it is desirable to cause said tabs 87 to adhere to the bottom of the container, and for this purpose a tack iron 88 (Figs. 13 and 14) is preferably employed, the tack iron comprising a sealing member carrying a cartridge heater 89, the iron being adapted to be moved into and out of engagement with the lower end of the container by means of an arm 90 actuated by suitable cam mechanism (not shown).

When the turret rotates the container and arbor from plow 85 to a position opposite the tack iron, a plunger 91 moves through the arbor and up against the inner surface of the closed end of the container to provide a support for said end of the container at the time that the tack iron is sealing tabs 87 in position. The sealing medium may be constituted by the thermoplastic lacquer coating on foil layer 33a. Preferably, tack iron 88 has extensions 88a which engage the two tabs adjacent the tips thereof to concentrate the pressure and heat at these points. In the form shown, extensions 88a are triangular in shape, but it will be understood that rectangular or other desired outlines may be employed.

In certain instances it has been found desirable to pat the end folds or tabs with a rubber pad to flatten them out, thereby removing the resiliency of the material, after the container leaves plow 85 and before it is engaged by the tack iron. Preferably, this operation is performed when the container has been moved by the turret and arbor to the position 92 shown in Fig. 12, the container occupying the position 93 when the tack iron comes into operation.

As shown more clearly in Fig. 27, the turret, carrying the container arbors 35, is operatively associated with a second turret mounted on a shaft 94, said turret having a plurality of holders 95 for the material, such as cigarettes, to be inserted in the containers. The material is deposited in holders 95 in any suitable manner now well understood in the art, as shown, for example, in U. S. Patent No. 1,926,192, dated September 12, 1933.

In one well-known packaging machine heretofore employed, it has been customary, when the turret was in a selected position, to force the material, such as cigarettes, in a compressed state from a holder and partly into the hollow arbor and hence only part way into the package surrounding the arbor. Thereafter, the turret was indexed through several stations, during which time the material expanded to its normal size, to a point where the material was forced completely through the arbor against the bottom of the package, continued movement being effective to strip the package with the material therein from the arbor. Containers heretofore employed have not been air-tight and even though the above procedure was carried out by high-speed machinery no difficulty resulted, since any tendency to compress the air between the inner end of the material and the adjacent bottom of the package at the stripping station was prevented by the escape of the air through the bottom of the package and the side walls.

Since the container described herein is air-tight, an attempt to employ the old methods resulted in the destruction of the bottom end of the container, the same being blown off the side walls at the stripping station due to the impact compression of the air within the container. Accordingly, in carrying out the present invention, the usual plunger (not shown) for moving the material from holder 95 into the arbor 35 with its surrounding container, as at 96 (Fig. 27), is so adjusted that the material is fully inserted into the container, in engagement with the bottom inner wall thereof at said station 96. Air between the bottom wall of the container and the cigarettes, for example, can escape outwardly around the cigarettes and no damage to the bottom end of the container results. Accordingly, when the arbor and filled container move to the stripping station, even though the material has expanded to normal, there is no compression of air at the stripping station and the container with the material therein is readily stripped from the arbor.

Figures 17, 18, 19, 20, 22:
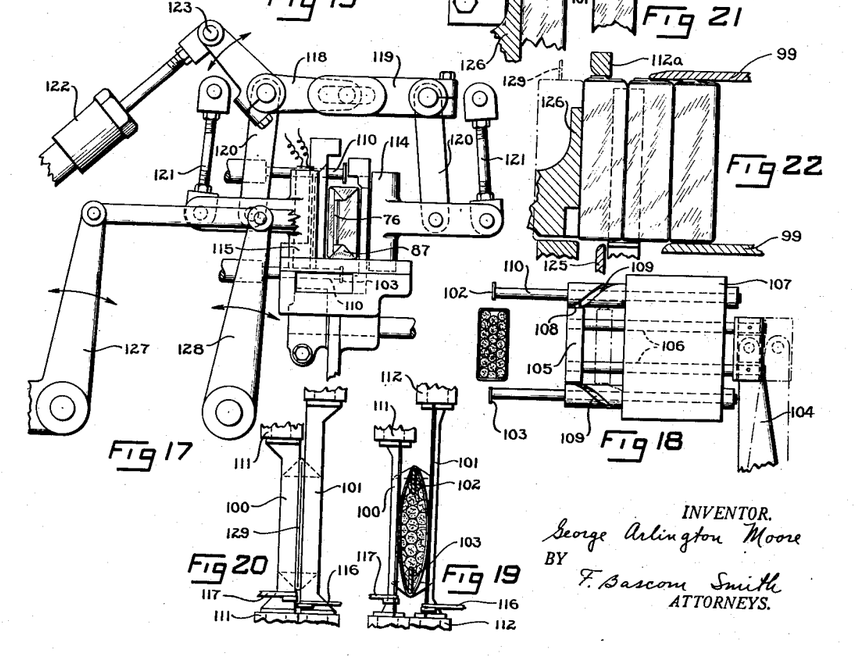
Fig. 17 is a front elevation of the actuating mechanism for the sealing devices shown in Fig. 15.
Fig. 18 is a side elevation of one form of mechanism which may be employed in spreading the open end of the filled container prior to the formation of the closure seam.
Fig. 19 is a detail sectional view illustrating a portion of the mechanism employed in making the top seam of the filled container, the mechanism being in an intermediate position.
Fig. 20 is a view of the mechanism shown in Fig. 19 with parts in their final position.
Fig. 22 is a detail sectional view illustrating one manner of folding over the top seam of the package.

Novel means are provided at the stripping station 97 (Figs. 15 and 27) for closing the open end of the filled container in a manner similar to that above described in connection with the bottom of the container. For this purpose, clamping members 46 and 48 are moved away from the sides of the container to release the same, whereupon a plunger 98 is moved by suitable cam mechanism (not shown) into the open mouth of the container against the material therein, further movement of said plunger being effective to press, through the material, against the inner end of the container and strip the same from the arbor to deposit it in a suitable holder, adjacent a trough 99 (Fig. 15), the container then being in a horizontal position (Fig. 17).

Adjacent the holder are mounted folding blades 100 and 101 (Figs. 15, 19 and 20) and spreaders 102 and 103 which perform the same functions as the folding blades and spreaders previously described but which are mounted and operated in a somewhat different manner. The spreader members are adapted to be actuated by a cam operated lever 104 (Fig. 18) adapted to actuate a crosshead 105 through the medium of rods 106 and a guiding member 107. The crosshead carries rollers 108 which engage in spiral slots 109 formed in sleeves secured to rods 110 that carry the spreader members 102, 103, the inner ends of said rods being rotatably mounted in the guide 107. Reciprocal movement of crosshead 105 is thus effective to swing the spreader members 102 and 103 inwardly and outwardly (Fig. 16) to engage and spread the projecting marginal portions of the container body in the manner described in connection with the mechanism of Figs. 8 and 11, whereby a "lead" is given to the folding blades 100 and 101.

Folding blade 100 is pivotally carried by a stationary holder 111 while a similar blade 101 is carried by a movable member 112. Blade holder 112 is provided with a downwardly extending portion 112a (as viewed in Figs. 21 and 22) for purposes to be described hereinafter, and is adapted to be moved up and down in a vertical plane by means of a sector 113 (Fig. 16) adapted to engage a rack 112b which may be formed integrally with said holder. Downward movement of holder 112 is effected simultaneously with the movement of the filled container from the arbor into the position shown in Fig. 17 where closing of the top end of the container is effected. With holder 112 in its lowermost position, heating and sealing irons 114 and 115 move inwardly, said irons carrying bars 116 and 118 (Figs. 19 and 20) provided on their outer ends with rollers for engagement with folding blades 100, 101 whereby these blades are actuated in the manner heretofore described against the efforts of suitable resilient means, such as spring 101a (Fig. 16), the mechanism being so timed that the fingers 102 and 103 lead the blades. The upper end of the filled container is thus folded in a manner previously described. The sealing irons now engage the outwardly projecting folded portion, sealing the same to form the end seam as shown in Figs. 21 and 29.

It is highly desirable that the sealing irons move into engagement with their faces parallel, and preferably said irons are actuated by parallel motion mechanism comprising arms 118 and 119 (Fig. 17) which are connected through links 120 and 121 to the irons. A barrel member 122, carrying yielding means, such as a coil spring, is operatively connected as at 123 to arm 118 to permit the irons to yield in the event that they foul the material. Preferably, iron 115 carries the cartridge heater while iron 114 is cooled by a blast of air conducted thereto by means of pipe 124 (Fig. 27).

At the time that the upper seam is being sealed by irons 114 and 115, the downwardly extending portion 112a of holder 112 (Fig. 21) occupies a position between the container being engaged by the irons and the adjacent container of a series in trough 99, whereby the previously sealed packages are maintained in the trough. A member 125 engages the opposite end of the side wall of the sealed containers in trough 99, moving in and out with member 112a and cooperating therewith, said member being shown in retracted position in Fig. 22.

Figures 15, 16, 21:
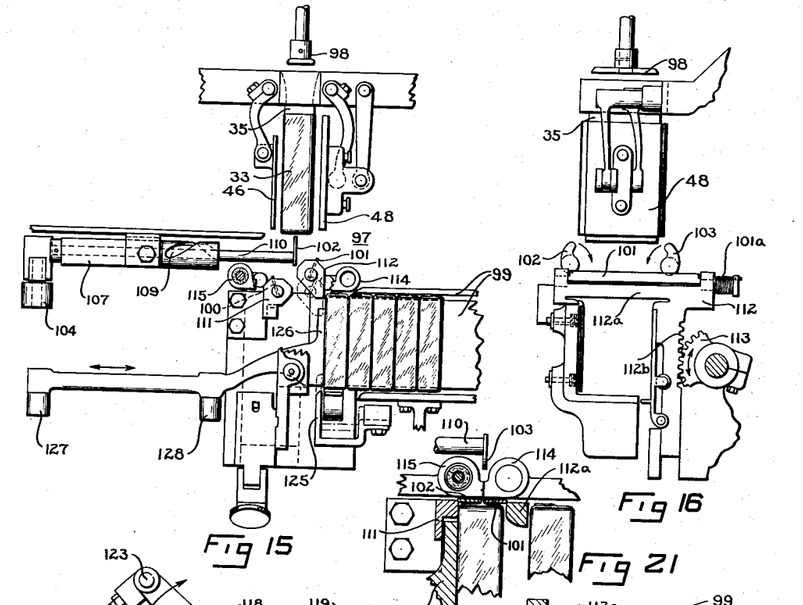
Fig. 15 is a top plan view, with parts broken away, illustrating the mechanism associated with the delivery of the container filled with the material and the mechanism for closing the filled container.
Fig. 16 is a side elevation of the mechanism shown in Fig. 15.
Fig. 21 is an enlarged detail plan view, partly in section, of the apparatus for sealing the top seam in final position.

After the seam has been formed by the sealing irons, they are returned to their normal position, whereupon holder 112 returns to its normal position, as shown in Fig. 15, with the portion 112a thereof adjacent the end of the seamed container, and a plunger 126 (Figs. 15 and 22) actuated by parallel arms 127 and 128 (Fig. 17) moves the sealed package to the right into trough 99, and as the upper end seam moves past portion 112a, said upstanding seam is folded down flat against the upper end of the package, as shown in Fig. 22, member 125 being withdrawn from the path of the container simultaneously with the movement of holder 112.

The container now is in the form shown in Fig. 30 wherein the seam 129, corresponding to seam 76 above described, lies flat against the upper end of the container with triangular tabs 87 projecting at either end of the seam from the container side walls.

The containers, in this condition, are moved along trough 99 until they arrive at a point 131 (Fig. 27) whereupon the containers are moved from a horizontal position to an upright position by mechanism well understood in the art, the upright position being indicated at point 132.

Figure 23:
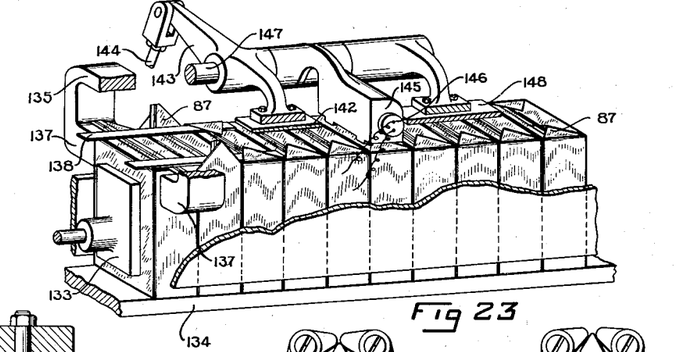
Fig. 23 is a perspective view, with parts broken away, illustrating the mechanism for folding and sealing the portion of the container resulting from the formation of the top closure seam.
Figure 24:
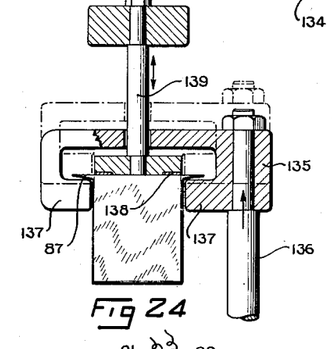
Fig. 24 is a detail side view of a portion of the mechanism shown in Fig. 23.

A revenue stamp may now be attached by any suitable means (not shown) to the container while it is in the position 132. A plunger 133 (Fig. 23) is effective to move the packages delivered from trough 99 along a trough 134 which holds the packages in upright position while the stamp is being applied and the triangular tabs are being folded upwardly through 180° to complete the package.

Figure 25:
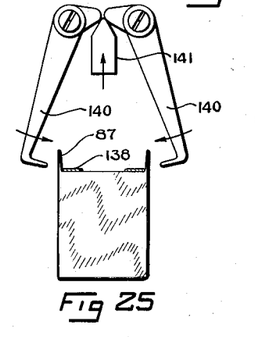
Fig. 25 is a detail side view of one form of means for folding the tabs of the top seam of the container.

After the stamp has been applied, the package is forced by plunger 133 into the plane of the folding tool 135 (Fig. 24) which is actuated by means of a rod 136. Tool 135 is provided with arms 137 which engage beneath the triangular tabs 87, whereby upward movement of rod 136 is effective to move the arms upwardly and to bring said tabs 87 from the horizontal position to the upright position shown in Fig. 25. To insure that a smooth, square fold will be effected, a pair of folding blades 138 adapted to be controlled by a member 139 engage the top of the container, the outer edge of each blade having engagement with the fold line of the tabs whereby the latter are folded upwardly to the position shown in Fig. 25 through an angle of 90°.

Figure 26:
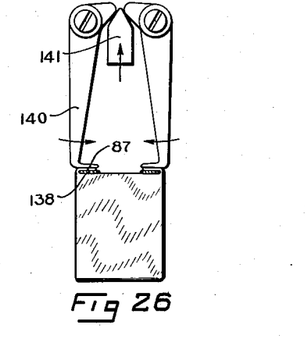
Fig. 26 is a view of the parts shown in Fig. 25 in a final position.

A pair of trucking arms 140 is now swung inwardly by means of the upward movement of a member 141 whereby said arms are moved to the position shown in Fig. 26 to effect a folding of the tabs from the vertical into the horizontal position against the upper end of the container. The latter is now moved by plunger 133 to a position underneath a patting plate 142, only a portion of which is shown. This plate extends clear across the top of one or more of the packages and is given a patting movement by means of an arm 143, rod 144 and suitable cam mechanism (not shown) to flatten out the tabs and reduce the resiliency of the same in order that the tabs may be sealed to the top of the package. For this latter purpose there is provided a tack iron 145 carrying a cartridge heater 146 which has a limited arcuate movement out of and into engagement with the top of the tabs, said iron being pivotally mounted on a shaft 147 which carries the patter 142. The pressure and heat of the tack iron are effective to secure tabs 87 to the top of the container.

Thereafter, the container moves past a cold plate 148 mounted on shaft 147 and having imparted thereto a patting movement, said plate being insulated from the tack iron and being adapted to engage the top of the containers to cool the tabs 87 and assist in the setting of the thermoplastic. The completed and filled containers are now ready to be discharged from the trough 134.

The wiring diagram of Fig. 27 shows the various connections from power lines 149 to the heating elements, including a main switch 150, a pilot light 151 and junction boxes 152, the latter being provided to facilitate the use of flexible connections to the cartridge heaters. It will be noted that the circuit to each heating element includes a resistance rheostat 153 which is operative to hold the temperature of the heating element constant and to permit each heating element to be independently controlled for varying conditions of operation. For example, the rheostats are adjusted for minimum resistance in heating up the machine whereby the same may be placed in operation very quickly. Moreover, the temperatures and the various heating elements must be varied with the seasons and frequently must be changed for the range of temperature through which the apparatus passes in the course of a day. Preferably, the body seaming iron 51 is provided with a heating element of 350 watts capacity while the other heating elements employed in the machine are of 200 watts capacity. In normal operation, the temperature of the heating elements should be from 400 to 450° F., although at unusually high speeds it may be necessary to employ higher temperatures.

A complete cycle of operation of the machine is as follows: The material 33 is fed from roll 34 (Fig. 27) by suitable feeding mechanism past a knife 37 and adjacent arbor 35. Knife 37 cuts the material into suitable lengths, and a length is now folded about the arbor as the turret carrying the arbors rotates in a clockwise direction. The longitudinal body seam is then effected by means of heating iron 51 when the arbor carrying the material for the container arrives at the station D opposite said iron. At the station E, the lower bottom end of the container is folded and sealed, at which time the end seam extends outwardly from the container body together with the triangular tabs 87. The partially formed container is now moved past plow 85 where the end seam is turned down against the end of the container and the triangular tabs are folded inwardly. The arbor then moves the partially formed container to the tack iron containing heating element 89 whereupon the triangular tabs are tacked in position. The partly formed container, which is closed at one end and open at the opposite end (see Fig. 28) now moves to the station 96 where the compacted material with which the container is to be filled is forced through the arbor until the same bears against the closed end of the container, whereupon the turret is indexed to bring the container to the stripping station 97 where the filled container is stripped from the arbor and the upper open end is closed, the end seam 129 first being formed (Fig. 29) and then turned over flat against the end of the container, as shown in Fig. 30. Plunger 126 now moves the containers along trough 99 in horizontal position to the point 131, whereupon suitable mechanism, well known in the art, transfers and turns the container into an upright position at 132, and plunger 133 is effective to move the container into operative position with respect to the tab folding arms 137. The triangular tabs 87 are now turned upwardly through 90° to the position shown in Fig. 31. Thereafter, the container is moved past the tuckers 140 so that the triangular tabs are now folded down as shown in Fig. 32. Thereafter, the container passes under the tack iron 145 and the cold plate patter 148 to complete the operation.

There is thus provided a novel method and novel apparatus for fabricating and packing an impervious container in an economical manner, said method being adapted to be carried out by large volume production machinery. The mechanism employed is very easily adapted to greatly simplify packing machines of the type shown, for example, in Patent No. 1,926,192 referred to above. The novel method comprehended utilizes a single web of laminated material as the sole medium for the fabrication of an hermetic package, thereby dispensing with the necessity for inner-wrappings, labels and outer covering materials, such as Cellophane, and additionally rendering it possible to dispense with the complicated machinery required for making containers comprising independent layers of material, labels, wrappers, etc. Furthermore, in carrying out the novel method of the invention a package is provided wherein ordinary viscous adhesives, which would contaminate the packaged materials and destroy the desired taste and odor thereof, are not used and hence, not closed within the package. Containers produced by practicing the present method of fabrication are exceptionally pleasing in appearance and highly serviceable to the consumer. The simple embodiments of the illustrated and described invention are particularly adapted to the packaging of cigarettes, and many millions of cigarettes have been packaged with the method disclosed but it is to be expressly understood that the method and apparatus may be employed in packaging other products and are not limited for use of cigarettes, as referred to above. Reference will accordingly be had to the appended claims for a definition of the limits of the invention.

What is claimed is:

1. The method of forming a container from a web of material which consists in cutting said material to a desired length, wrapping said material about a hollow form with the ends thereof overlapping, sealing the overlapping ends whereby a hollow open-ended body is formed, folding the material to form an end closure in said body, plowing over the fold of the end closure whereby the portions thereof lie substantially flat against the end of said body, tacking down the folded over portions by means of heat and pressure, inserting the product to be packed into the hollow form and into engagement with the closed end of the body, applying pressure against the product to remove the filled body from the hollow form, and closing and sealing the other end of the container.

2. In the container making art, the method which includes the steps of forming an open-ended body from a blank wrapped about a hollow tube, the ends of said blank overlapping and a portion of the blank overhanging the tube, supporting the overhanging ends of the lap portion of the blank, sealing the overlapping ends of the blank by means of heat and pressure, applying pressure to the inner side walls of the overhanging portion of the open-ended body to expand the same, and subjecting said overhanging portion to the action of angularly moving members for folding said portion to form an end wall substantially perpendicular to the side walls of the body and an outwardly extending projection.

3. The method of forming a container which includes wrapping a blank about a hollow arbor, sealing the overlapping ends of the blank to form a body, a portion of said blank overhanging one end of the arbor, folding and sealing the overhanging portion of the blank to form an hermetic end closure, inserting a product into the hollow arbor and simultaneously into engagement with the hermetic end closure, applying pressure to the product to strip the filled container from the arbor, and hermetically closing the opposite end of the container.

4. The method of forming and filling an hermetically sealed container which comprises wrapping a blank about a hollow arbor, with a portion of the blank extending beyond one end of the arbor, sealing the overlapping ends of the blank including the overhanging portions to form an impervious body seam, folding and hermetically sealing the overhanging portion of the blank to form an end closure, inserting a product through the arbor into engagement with said end closure, applying pressure to the product to strip the open-ended container from the arbor, folding and sealing the open end to form an hermetic closure, and tacking the folded end to the end wall of the container.

5. In combination with a hollow arbor adapted to support a hollow body formed from a blank, said body having a closed end, a plunger movable through the arbor into engagement with the closed end of the hollow body, and a tack iron movable into engagement with the opposite face of the closed end whereby heat and pressure may be applied thereto.

6. In apparatus for hermetically sealing the end of a container, a pair of spreader fingers adapted to expand the side walls of the open end of the container, a pair of rotatable folding blades for forming an end wall in the container and a projecting tab, a movable support for one of said blades, sealing irons for sealing the tab formed by the folding blades in the end of the container, said movable support having a projecting portion adapted to fold said tab downwardly against the end of the container, a plunger for moving said container past said projecting portion of the support, and a trough for receiving said container, said projecting portion extending between a container in the trough and the container having the end wall formed therein.

7. In combination with an arbor adapted to receive a hollow body formed from a blank, the hollow body having a portion extending beyond the end of the arbor, a rotatable shaft, means for rotating said shaft, an arm rigidly secured to said shaft for rotation therewith, a second arm mounted on the shaft for rotation independently thereof, linkage mechanism operatively connected to said arms whereby movement of the first arm is transmitted to the second arm, sealing members carried by said arms, a second pair of arms rotatably mounted on the shaft, folding blades carried by said last-named pair of arms, yielding means for operatively connecting said second pair of arms to said first pair of arms, and spreader fingers operated by said shaft and adapted to engage the overhanging portion of said hollow body prior to the engagement therewith of said folding blades and sealing irons.

8. The method of tacking tabs to the end of a closed container formed from a blank of laminated foil and paper and filled with a yieldable product which comprises patting the tabs on the ends of one or more of said containers, thereafter subjecting the tabs to heat and pressure, and thereafter patting the pressed and heated tabs to cool and set the same.

9. In the art of making containers at high speed, the method which includes joining overlapping ends of a blank to form a tubular container body, exerting pressure on the inner surfaces of opposed walls of said body adjacent an end thereof to initiate expansion of said walls for drawing opposed halves of the inner peripheral surface of a marginal portion of said body toward each other, and subjecting the outer surface of said body to the action of angularly moving members to complete the expansion of said walls and to form an end wall substantially perpendicular to the side wall of the body and a projecting tab with said opposed halves of the inner peripheral surface of the marginal portion of said body in engagement.

10. In apparatus for closing the end of a container, a pair of angularly movable spreader fingers adapted to expand the side walls of the open end of the container, a shaft having a helical groove therein supporting each of said fingers, means for rotatably supporting said shafts, and reciprocating means operatively engaging said grooves for imparting angular movement to said shafts and fingers.

11. In apparatus for closing the end of a container, a pair of angularly movable folding plates for forming an end wall in the container and a projecting tab, a linearly movable support for one of said plates, said support having a projecting portion, and means for moving said container past said projecting portion on the support when the latter is in a predetermined position whereby said projecting tab is folded down against said end wall.

12. In apparatus for closing the open end of a container, a rotatable shaft, means for rotating said shaft, angularly movable spreader fingers adapted to expand the side walls of the open end of the container, means for supporting said fingers for angular movement about axes extending at an angle to the axis of rotation of said shaft, and cooperating gear members interposed between said shaft and fingers whereby the latter are moved in unison with the shaft.

13. In apparatus for closing the open end of a container, a rotatable shaft, means for rotating said shaft, angularly movable spreader fingers adapted to expand the walls at the open end of the container, cooperating gear members interposed between said shaft and fingers whereby the latter are actuated in unison with the shaft, and means carried by said shaft for folding the expanded portion of said container to form an end wall and a projecting closure tab.

14. In apparatus for closing the open end of a container, a rotatable shaft, means for rotating said shaft, angularly movable spreader fingers adapted to expand the open end of the container, cooperating gear members interposed between said shaft and fingers whereby the latter are actuated in unison with the shaft, means carried by said shaft for folding the expanded portion of said container to form an end wall and a projecting closure tab, and means carried by said shaft for applying heat and pressure to opposite sides of said closure tab for joining the engaging surfaces thereof.

GEORGE ARLINGTON MOORE.